United States Patent
Fisher

[15] 3,669,217
[45] June 13, 1972

[54] ESCAPE SLIDE POSITIONING TUBE
[72] Inventor: John M. Fisher, 622 Sackett Avenue, Cuyahoga Falls, Ohio 44221
[22] Filed: Nov. 16, 1970
[21] Appl. No.: 89,828

[52] U.S. Cl. ............................................ 182/48, 193/25
[51] Int. Cl. ................................................ A62b 1/20
[58] Field of Search ............................... 182/48; 193/25

[56] References Cited

UNITED STATES PATENTS

| | | | |
|---|---|---|---|
| 3,092,232 | 6/1963 | Adams | 193/25 |
| 3,463,266 | 8/1969 | Day | 193/25 |
| 3,463,287 | 8/1969 | Smith | 193/25 |

*Primary Examiner*—Reinaldo P. Machado
*Attorney*—John D. Haney and Harold S. Meyer

[57] ABSTRACT

A positioning tube for an escape slide of the type used for aircraft having a long inflatable ramp which is inflated from the folded condition to the extended position in which the location and attitude of the ramp is controlled by an inflatable tube attached to the underside of the ramp for engagement with the aircraft fuselage to which the ramp is attached for biasing the ramp outward from the fuselage. Manifolding is provided for rapid inflation of the positioning tube simultaneously with inflation of the ramp and before the ramp is completely unfolded and extended. Releasable fasteners of three-dimensional fabric having resilient hook fibers hold the ramp in the folded condition until it is inflated to prevent engagement with the ground prior to inflation and positioning.

8 Claims, 6 Drawing Figures

PATENTED JUN 13 1972

INVENTOR.
JOHN M. FISHER
BY John D. Haney
ATTY.

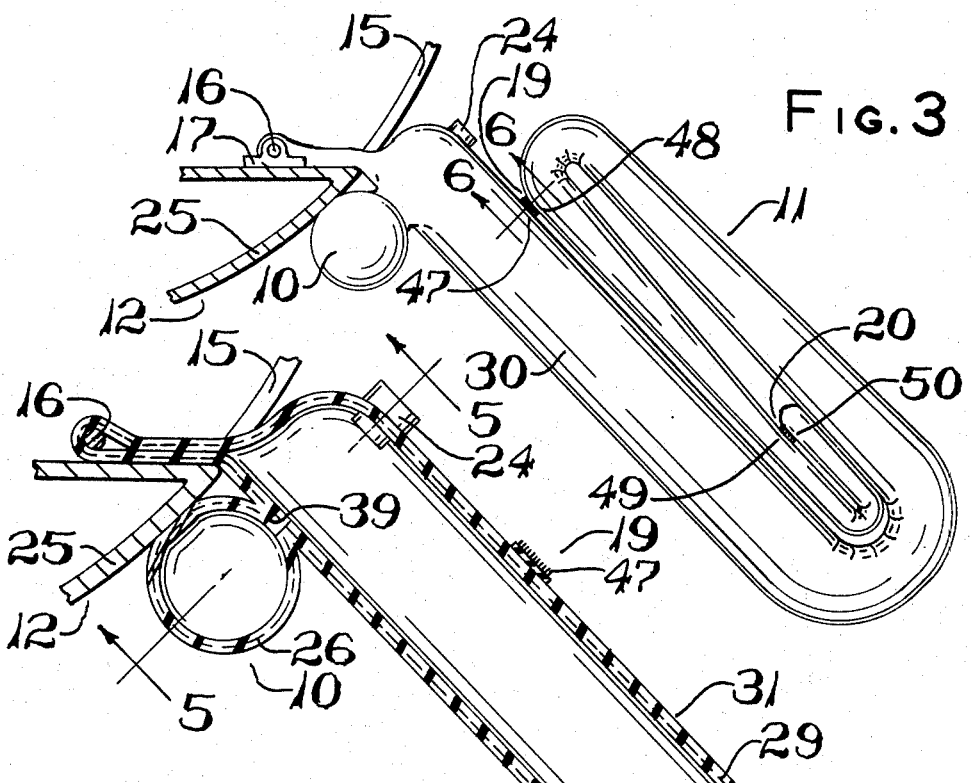
Fig. 3
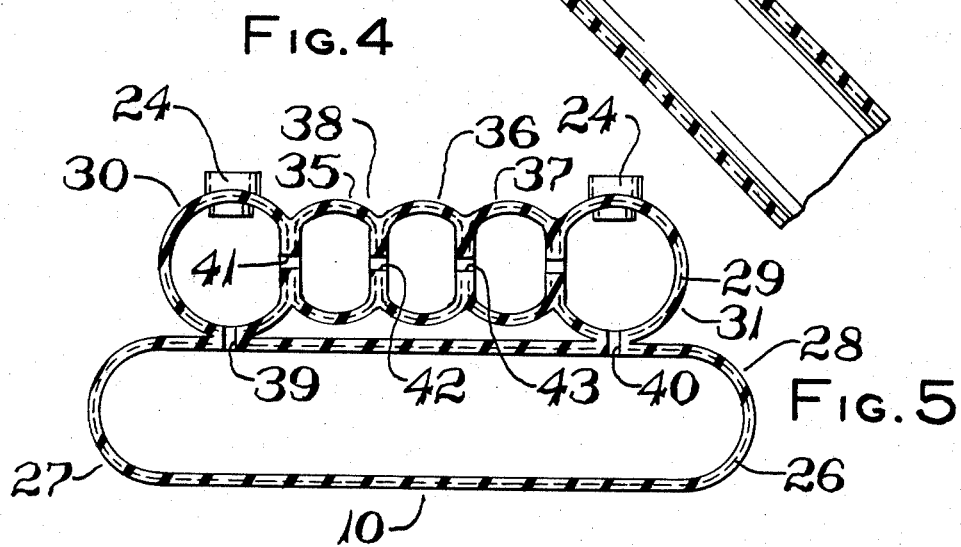
Fig. 4
Fig. 5
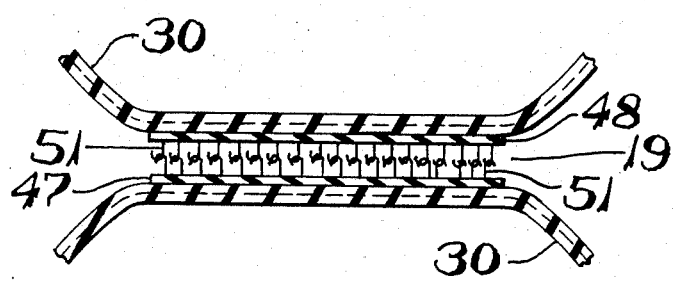
Fig. 6
INVENTOR.
JOHN M. FISHER
BY John D. Haney
ATTY.

ESCAPE SLIDE POSITIONING TUBE

BACKGROUND OF THE INVENTION

This invention relates to inflatable escape slides for aircraft and particularly to the connection between the slide and the aircraft. During normal operation of the aircraft the escape slide is folded in a compact package which is stowed in a space at the doorway or other exit of the aircraft. One end of the slide is fastened to the aircraft and when the slide is to be used it is first unfolded and hangs from the aircraft fuselage in a vertical position. It is then inflated to a pressure where it can be used to support escaping passengers on a sliding surface. The ejection of the slide from the aircraft and the inflation to an operating condition takes place in a matter of seconds and therefore the slide must automatically assume the proper position for accommodating escaping passengers.

One of the problems encountered with inflatable slides of this type has been caused by high winds which blow the slide under the aircraft during inflation and cause the slide to jam against the ground under the aircraft in a position where it is unusable. Another problem is caused when the slide contacts obstacles on the ground and is pushed out of position by the obstacles into an unusable attitude. These problems are complicated by the fact that the slide has an extended length greater than the distance between the fuselage and the ground and it has been difficult to prevent the slide from contacting the ground before a minimum usable pressure is obtained.

The need for escape slides which always inflate in a usable position is greater today than ever before because not only are escape slides needed for evacuating a disabled aircraft but the slides are very important in evacuating aircraft where there is a bomb threat or a hijacking incident. Usually these incidents occur on large aircraft where a great number of people must leave the aircraft in a very short period of time. These larger aircraft also are a greater distance from the ground and the escape slides must therefore be positioned in a usable position over a long span which increases the problems caused by high winds and obstacles on the ground. For example, some of these slides for the larger aircraft are over 35 feet long in the extended condition.

SUMMARY OF THE INVENTION

According to this invention, an inflatable fabric positioning tube is incorporated into the bottom wall of the escape slide adjacent the upper end to move the upper end of the slide into its operating position against wind loads and over obstacles on the ground. The tube forceably rotates the semi-inflated slide outward and upward from the vertical hanging position after ejection from the aircraft and thereby prevents jamming of the slide against the ground or blowing it under the aircraft during high wind conditions. Contact of the slide with the ground prior to the time when it is inflated with a minimum usable pressure is prevented by releasable fasteners which hold the deflated and semi-inflated slide in a longitudinally folded condition until the pressure within the slide is great enough to disengage the fasteners and extend the slide into the fully inflated condition.

During inflation of the slide, the inflatable fabric positioning tube is inflated rapidly to a fully inflated condition prior to the full inflation of the slide so that the slide is moved outward and upward from the vertical hanging position and will extend in an inclined position away from the aircraft when fully inflated. The positioning tube also has a shape and location to bias the slide in the desired direction outward from the aircraft and thereby avoids extension too far forward or too far aft of the aircraft exit.

The accompanying drawings show one preferred form made in accordance with and embodying this invention and which is representative of how this invention may be practiced.

BRIEF DESCRIPTION OF THE DRAWINGS

In the drawings:

FIG. 3 is a view like FIG. 2 showing the positioning tube fully inflated and the slide partially inflated in the partially folded condition.

FIG. 4 is a sectional view taken along the plane of line 4—4 of FIG. 1, parts being broken away showing the upper end of the fully inflated slide and positioning tube in the fully inflated condition in greater detail.

FIG. 5 is a section taken along the plane of line 5—5 of FIG. 4.

FIG. 6 is an enlarged section taken along the plane of line 6—6 of FIG. 3 showing the fastening elements in greater detail, parts being broken away.

DETAILED DESCRIPTION

Figures 1, 2:
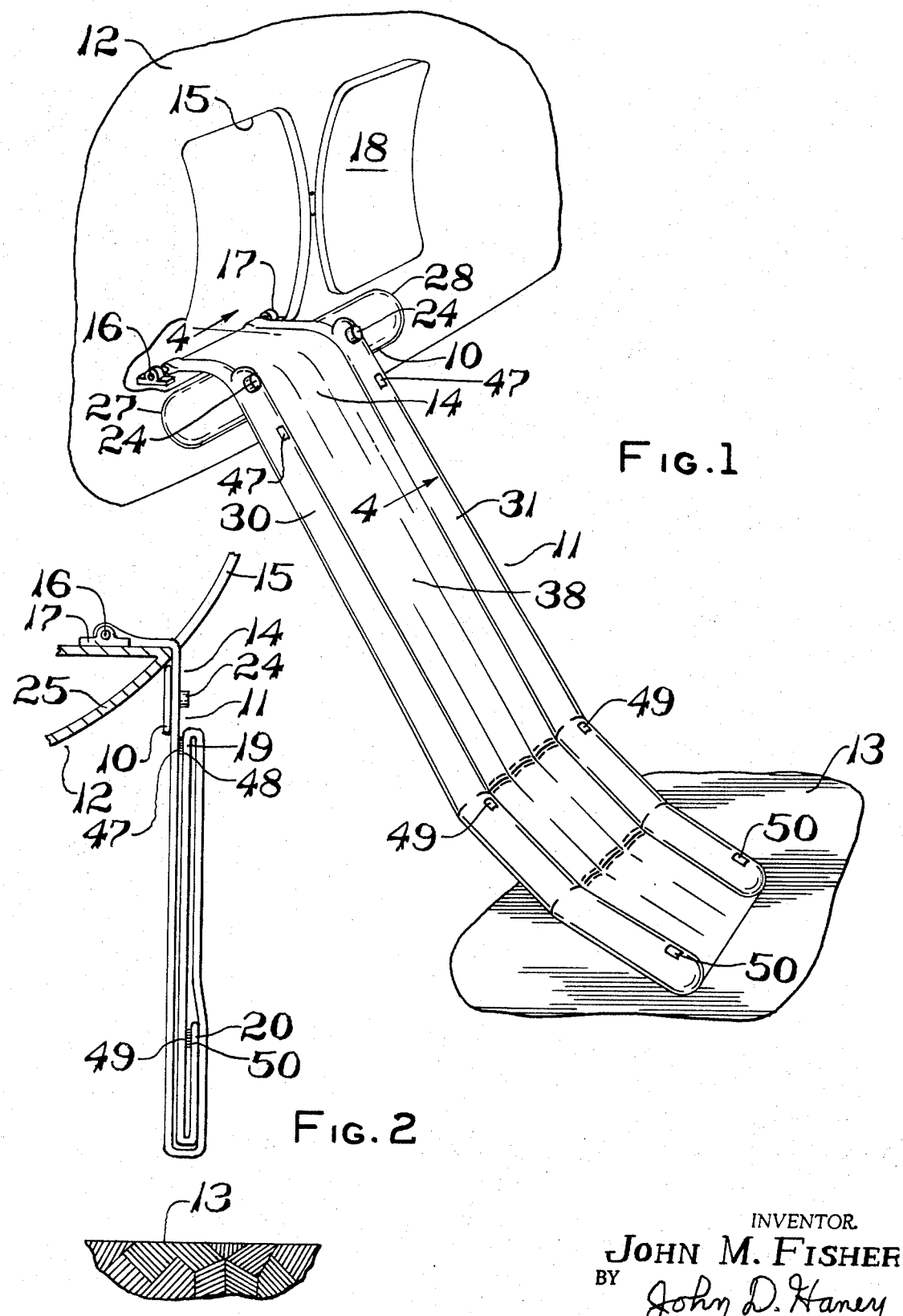
FIG. 1 is a view in perspective of an inflatable slide extending from an aircraft exit to the ground and showing the positioning tube embodying the invention, parts being broken away.
FIG. 2 is a side elevation, partly in section, of the slide shown in FIG. 1 in the partially extended position before inflation with fasteners holding the slide in a partially folded condition.

Referring to FIG. 1, a positioning tube 10 is shown mounted in a supporting and locating condition under an escape slide 11 extending from a supporting structure such as an aircraft fuselage 12 to the ground 13 so that passengers may slide down the slide safely from the aircraft to the ground. The escape slide 11 is fastened to the fuselage 12 at an upper end 14 in a doorway 15 by a rod 16 extending through the upper end and mounted on the fuselage in brackets 17 which are fastened to the fuselage.

The positioning tube 10 and escape slide 11 are shown in the fully inflated operating position in FIG. 1; however, in the normal operating condition of the aircraft, they are folded in a compact package and stowed within the aircraft but with the upper end 14 of the escape slide attached to the fuselage 12. When the escape slide 11 is needed, an exit such as door 18 is opened and the slide is ejected from the aircraft in the deflated and partially folded condition as shown in FIG. 2. The positioning tube 10 and escape slide 11 hang vertically downward from the fuselage 12 and the escape slide is held in partially folded position by releasable fasteners 19 and 20 located at each side and at longitudinally spaced-apart positions along the length of the escape slide. In this partially folded condition, the escape slide 11 is maintained out of contact with the ground 13.

Immediately upon ejection of the positioning tube 10 and escape slide 11 out of the aircraft fuselage 12, fluid pressure inflating means such as air pumps 24 are actuated causing immediate inflation of the positioning tube 10 and partial inflation of the escape slide 11 into the position and condition shown in FIG. 3. The positioning tube 10 engages a wall 25 of the fuselage 12 and biases the escape slide 11 outward and upward away from the wall into the inclined position shown in FIG. 3. During this inflation of the escape slide 11 the fasteners 19 and 20 hold the slide in the partially inflated position out of engagement with the ground 13 or obstacles on the ground so that the slide may be biased away from the wall 25 without interference.

Upon further inflation of the escape slide 11 the inflation pressures within the slide tending to expand and straighten the slide, overcome the holding forces of the releasable fasteners 19 and 20 whereupon the slide is fully inflated into the condition shown in FIG. 1 and engages the ground 13 ready for use by the passengers. The air pumps 24 also are stopped and further inflation terminated.

Referring to FIG. 4, the construction of the positioning tube 10 is shown in greater detail and consists of a body of inflatable, foldable material such as a nylon fabric 26 having cords extending transversely of the positioning tube so that the tube has a substantially cylindrical cross section in the inflated condition. The cords of the fabric 26 are embedded in a material impervious to air or other inflating mediums such as rubber or other rubberlike material to withstand high pressures within the tube 10. Lateral extensions 27 and 28 of the tube 10 extend beyond the edges of the escape slide 11 and engage the wall 25 in the inflated condition to provide lateral stability to the escape slide.

The escape slide 11, as shown in greater detail in FIGS. 4 and 5, is constructed of inflatable, foldable material such as nylon fabric 29 having cords extending in suitable directions to provide for strength, reinforcement and proper shaping of the escape slide. The cords of the fabric 29 are embedded in an impervious resilient rubberlike material such as neoprene rubber. At the edges of the escape slide 11, guiderail bumpers 30 and 31 extend over the length of the slide and are connected by intermediate supporting tubes 35, 36 and 37 which support a sliding surface 38. The guiderail bumpers 30 and 31 retain the passengers on the sliding surface 38 as they are transferred from the upper end 14 of the slide to the ground 13.

As shown in FIGS. 4 and 5, air pumps 24 are installed in the wall of the guiderail bumpers 30 and 31 at the upper end 14 for injecting air into the slide 11 and positioning tube 10. The positioning tube 10 is fastened to the bottom of the escape slide 11 by adhesives or other suitable fasteners at a position close to the upper end 14 of the escape slide so that it can be rapidly inflated and upon inflation the tube will engage the wall 25 of the supporting structure 12.

At the connection of the lower wall of the escape slide 11 and the wall of the positioning tube 10, openings 39 and 40 are provided between the positioning tube and the guiderail bumpers 30 and 31 for the passage of fluid pressure medium such as high pressure air from the air pumps 24 which are also located at the upper end 14 of the escape slide 11 from the chambers within the guiderail bumpers 30 and 31 to the space within the positioning tube 10 for rapid inflation. This manifolding provided by the passages 39 and 40 causes the positioning tube 10 to be fully inflated, as shown in FIGS. 3 and 4, prior to the time that the escape slide 11 is fully inflated and thereby provides positioning of the escape slide in the partially inflated condition at an incline so that in the final fully inflated position, shown in FIG. 1, it will be operable with the sliding surface 38 facing upwardly and the guiderail bumpers 30 and 31 at each side for guiding the passengers down the slide.

Openings 41, 42 and 43 are also provided in the walls of the escape slide 11 connecting the guiderail bumpers 30 and 31 with the spaces within the intermediate supporting tubes 35, 36 and 37 for inflation of these parts of the slide as shown in FIG. 5.

Opposing members 47 and 48 on fastener 19 and opposing members 49 and 50 on fastener 20 are provided for releasable engagement. As shown more clearly in FIG. 6, the fastener 19 has opposing members 47 and 48 which are adhered to the wall of the guiderail bumper 30 at longitudinally spaced-apart positions along the slide 11. Each of these members 47 and 48 are of three-dimensional fabric having stiff, hooked fibers 51 extending outwardly for engagement with the fibers of the opposing members. This fabric may be a woven nylon type material and consists of hook type fibers 51 which are monofilaments. The opposing fibers 51 interconnect for holding the opposing members together.

In the operation of the positioning tube 10 and escape slide 11 the deflated escape slide is first folded with the opposing members 49 and 50 pushed together so that the fibers 51 will be hooked together in fasteners 20 and then the deflated slide is folded so that opposing members 47 and 48 are pushed together with the fibers 51 hooking together to form fasteners 19. The slide is then further folded with the positioning tube 10 and stowed in the aircraft. Upon ejection of the slide 11 from the fuselage 12, the hooked fibers 51 will maintain the escape slide in the partially extended condition, as shown in FIG. 2, and will also maintain the escape slide 11 in the partially folded condition in the partially inflated condition, as shown in FIG. 3, when the positioning tube 10 is fully inflated. The escape slide 11 will be inclined and directed outward from the fuselage 12 prior to fully extending to the condition shown in FIG. 1. As the pressure in the escape slide 11 increases, the forces tending to pull the opposing members 47 and 48, and 49 and 50 apart increase until the hooked fibers 51 are disengaged whereupon the guiderail bumpers 30 and 31 and the intermediate supporting tubes 35, 36 and 37 are fully inflated and extended in the position shown in FIG. 1.

The construction of the positioning tube 10 is especially useful and important when constructed with an inflatable escape slide 11 of the type shown; however, it is understood that the positioning tube may be used in other applications where different types of extendable ramps are used which need to be directed and positioned.

I claim:

1. An escape slide positioning tube for a foldable slide having inflatable longitudinal members comprising an inflatable hollow body of flexible foldable material disposed transversely of said slide under said longitudinal members of the escape slid at the end of the slide attached to a supporting structure, inflating means and an opening in said inflatable hollow body having a diameter less than the diameter of said inflatable hollow body for directing a fluid medium from said inflating means to said inflatable hollow body before the slide is extended whereby inflation of said inflatable hollow body will bias the slide away from said supporting structure in the folded condition to position the slide in the desired direction and inclination relative to said supporting structure in the extended condition.

2. An escape slide positioning tube according to claim 1 wherein the escape slide is inflatable and said inflating means are connected to said inflatable hollow body and to the escape slide for inflation of said inflatable hollow body through said opening before the slide is completely inflated.

3. An escape slide positioning tube according to claim 2 wherein said opening in said inflatable hollow body is in communication with the escape slide for passage of a fluid medium from the escape slide to said inflatable body and the connection to the escape slide from said inflating means is in close proximity to said opening in said inflatable hollow body whereby inflation of said inflatable hollow body takes place before the escape slide is completely inflated for positioning of the slide before it is fully extended.

4. An escape slide comprising a plurality of longitudinally extending inflatable supporting tubes fastened together to support a sliding surface, longitudinally extending inflatable guiderail bumpers at the edges of said slide fastened to the outermost of said supporting tubes at the edges of said sliding surface and a transversely extending inflatable positioning tube projecting downward and disposed under said supporting tubes and said guiderail bumpers at the upper end of the slide attached to a supporting structure, and fluid pressure inflating means connected by fluid-conducting openings to said supporting tubes, said guiderail bumpers and said positioning tube for inflating said escape slide.

5. An escape slide according to claim 4 wherein said fluid-conducting openings to said positioning tube are in close proximity to said inflating means for inflation of said positioning tube before said supporting tubes and said guiderail bumpers are completely inflated for positioning of the slide before it is fully extended.

6. An escape slide according to claim 4 wherein said guide rail bumpers have releasable fasteners mounted at longitudinally spaced-apart portions on said guiderail bumpers for holding said slide in a partially folded condition prior to inflation.

7. An escape slide according to claim 6 wherein one of said fasteners is located at a portion of said bumpers near the lower end of the slide for fastening the lower ends in a folded condition and another of said fasteners is located at a portion of said bumpers near the upper end of said slide for fastening the remaining portions of the slide in a folded condition.

8. An escape slide according to claim 12 wherein said releasable fasteners include members of three-dimensional fabric having stiff resilient hooks intermeshing in the fastened portions until the escape slide is partially inflated and then resiliently releasing said longitudinally spaced-apart portions as the escape slide is further inflated to the fully extended position.

* * * * *

PO-1050
(5/69)

UNITED STATES PATENT OFFICE
CERTIFICATE OF CORRECTION

Patent No. 3,669,217          Dated June 13, 1972

Inventor(s) John M. Fisher

It is certified that error appears in the above-identified patent and that said Letters Patent are hereby corrected as shown below:

Column 4, line 21, (claim 1), "slid" should read ---slide---.

Column 5, line 1, (claim 8), "claim 12" should read ---claim 6---.

Signed and sealed this 17th day of October 1972.

(SEAL)
Attest:

EDWARD M. FLETCHER, JR.
Attesting Officer

ROBERT GOTTSCHALK
Commissioner of Patents